US012780345B2

(12) United States Patent
Chen

(10) Patent No.: US 12,780,345 B2
(45) Date of Patent: Nov. 3, 2026

(54) FOUR-WHEELED MOTORCYCLE

(71) Applicant: HUZHOU DAIXI ZHENHUA TECHNOLOGY TRADE CO., LTD., Huzhou (CN)

(72) Inventor: Xinhua Chen, Huzhou (CN)

(73) Assignee: HUZHOU DAIXI ZHENHUA TECHNOLOGY TRADE CO., LTD., Huzhou (CN)

(*) Notice: Subject to any disclaimer, the term of this patent is extended or adjusted under 35 U.S.C. 154(b) by 263 days.

(21) Appl. No.: 18/675,185

(22) Filed: May 28, 2024

(65) Prior Publication Data

US 2025/0368287 A1 Dec. 4, 2025

(51) Int. Cl.
*B62K 5/01* (2013.01)
*B62J 25/00* (2020.01)

(52) U.S. Cl.
CPC ................. *B62K 5/01* (2013.01); *B62J 25/00* (2013.01)

(58) Field of Classification Search
CPC ................................... B62K 5/01; B62J 25/00
See application file for complete search history.

(56) References Cited

U.S. PATENT DOCUMENTS

| | | | | |
|---|---|---|---|---|
| 9,878,650 B2 * | 1/2018 | Reed | ...................... | B60N 2/012 |
| 2016/0288686 A1 * | 10/2016 | Reed | .................... | B62D 21/183 |

FOREIGN PATENT DOCUMENTS

| | | | | | |
|---|---|---|---|---|---|
| CN | 112776890 A | * | 5/2021 | ........... | B62D 23/005 |
| CN | 113353149 A | * | 9/2021 | ............... | B60N 2/01 |
| CN | 214797545 U | * | 11/2021 | | |
| CN | 215155297 U | * | 12/2021 | | |
| CN | 119551120 A | * | 3/2025 | ............. | B60B 35/14 |
| KR | 100692152 B1 | * | 3/2007 | ............. | B62D 31/02 |
| WO | WO-2006072077 A2 | * | 7/2006 | ............. | B60G 11/15 |
| WO | WO-2010148014 A1 | * | 12/2010 | ........... | B62D 27/065 |
| WO | WO-2022258033 A1 | * | 12/2022 | .............. | B60L 50/66 |
| WO | WO-2025237137 A1 | * | 11/2025 | ............... | B62K 5/01 |

* cited by examiner

*Primary Examiner* — Drew J Brown
(74) *Attorney, Agent, or Firm* — Bayramoglu Law Offices LLC

(57) ABSTRACT

A novel four-wheeled motorcycle is provided. A body is detachably provided on a frame. The frame includes two support beams provided symmetrically with each other. An upper frame cover installation frame is provided on the front halves of the support beams. A steering gear bracket is provided below the upper frame cover installation frame. A connection support unit is provided between the upper frame cover installation frame and the reinforcement insurance portion. Outer extension frames are respectively provided on outer sides of the rear halves of the support beams. Inner extension frames are provided between the outer extension frames, and each of the inner extension frames is connected to an inner side of each of the support beams. Upper sides of the rear halves of the support beams are synchronously connected to a support frame.

9 Claims, 10 Drawing Sheets

FOUR-WHEELED MOTORCYCLE

TECHNICAL FIELD

The present invention relates to a four-wheeled motorcycle, in particular to a novel four-wheeled motorcycle.

BACKGROUND

A frame is a structure bridging over the front and rear axles of a vehicle, commonly known as beams, which are the matrix of the vehicle. The beams are generally composed of two longitudinal beams and several support beams, which are supported on the wheels through the suspension device, the front axle, and the rear axle. The frame is required to be strong and rigid enough to withstand the load of the vehicle and the impact from the wheels. The function of the frame is to support and connect the assemblies of the vehicle, so that the assemblies can maintain a relatively correct position and bear various loads from the inside and outside of the vehicle. In the prior art, on the one hand, the precision of the assembled frame is insufficient, resulting in the subsequent inability to fit perfectly with the body to cause low stability; on the other hand, there are some problems such as long assembly time and difficult assembly. Additionally, the cost of manufacturing the frame and the body is high and the structural strength is low.

Therefore, those skilled in the art are committed to providing a novel four-wheeled motorcycle which can effectively solve the above technical problems.

SUMMARY

In view of the above defects of the prior art, the technical problem to be solved by the present invention is to provide a novel four-wheeled motorcycle which can effectively solve the above technical problems.

In order to achieve the above objective, the present invention provides a novel four-wheeled motorcycle, including a body and a frame. The body is detachably provided on the frame.

The frame includes two support beams provided symmetrically with each other; front ends of the support beams are connected by a reinforcement insurance portion, and an upper frame cover installation frame is provided on the front halves of the support beams; a steering gear bracket is provided below the upper frame cover installation frame; a connection support unit is provided between the upper frame cover installation frame and the reinforcement insurance portion; outer extension frames are respectively provided on outer sides of the rear halves of the support beams; inner extension frames are provided between the outer extension frames, and each of the inner extension frames is connected to an inner side of each of the support beams; and upper sides of the rear halves of the support beams are synchronously connected to a support frame, and an outer edge of the support frame is provided with a plurality of positioning plates.

Preferably, the reinforcement insurance portion and the support beams are in an integrated structure; the connection support unit includes two U-shaped support tubes provided symmetrically with each other; a lower end of each of the U-shaped support tubes is connected to an upper side of the front half of each of the support beams, an outer side of an upper end of each of the U-shaped support tubes is provided with a first connecting piece, and inner sides of the U-shaped support tubes are connected by a connecting section; and the U-shaped support tube is connected to the upper frame cover installation frame through an extension tube.

Preferably, the connecting section includes two inclined sections provided symmetrically with each other, each of the inclined sections is arranged obliquely with a low outer end and a high inner end, the outer end of each of the inclined sections is connected to each of the U-shaped support tubes, the inner ends of the inclined sections are respectively connected to two ends of a straight section, and the two inclined sections and one straight section are in an integrated structure; and a plurality of second connecting pieces are provided on the straight section.

Preferably, the extension tube includes an extension portion, a front end of the extension portion is connected to the U-shaped support tube, and a rear end of the extension portion is provided with a bending portion; one end of the bending portion is connected to the extension portion, and the other end of the bending portion is bent outward and connected to the upper frame cover installation frame; and a plurality of third connecting pieces are provided along a length direction of the extension portion, and every two adjacent third connecting pieces are misaligned.

Preferably, a crossbar is provided between the reinforcement insurance portion and the connecting section, and the crossbar includes a connecting portion; a front end of the connecting portion is provided with an extension section, the connecting portion and the extension section are in an integrated structure and with an L-shaped cross section, two ends of the connecting portion are respectively connected to the upper sides of the two front halves of the support beams, and a plurality of positioning seats are provided on the connecting portion; a front side of the extension section is provided with a plurality of cylinders; and a rear side of the connecting portion is provided with a fourth connecting piece.

Preferably, the inner side of the front half of the support beam is provided with a positioning frame, and middle sections of the support beams are connected by a supporting piece; the supporting piece is provided with a power installation plate and the steering gear bracket; the steering gear bracket includes an arc-shaped main body section; the middle section of the main body section is provided with a fifth connecting piece, two ends of the main body section are respectively connected to an upper side of the support beam and an upper side of the power installation plate, and the arc-shaped main body section is provided with a vertical tube; the vertical tube and the main body section are respectively provided with sixth connecting pieces matched with each other, and a lower half of the vertical tube and a lower half of the main body section are connected by a horizontal tube; and an upper side of the horizontal tube is provided with two seventh connecting pieces matched with the fifth connecting piece.

Preferably, a reinforcement tube is provided at a corner between the main body section and the support beam, and a plurality of eighth connecting pieces are provided at a rear end of a lower side of each of the support beams.

Preferably, the outer extension frame includes a first positioning section, an outer expansion section and a second positioning section that are integrated with each other; an inner side of the first positioning section and an inner side of the second positioning section are connected to an outer wall of the support beam; a length of the second positioning section is greater than a length of the first positioning section; the outer expansion section on each of the two outer extension frames has a space that gradually increases from front to back; each of the first positioning sections and each of the second positioning sections are connected by each of the outer expansion sections; and a ninth connecting piece is provided on each of the outer extension frames.

Preferably, a front half of the inner extension frame is provided with a first extension section, and each of the first extension sections is inclined inward; a second extension section is provided on the outer wall of the rear section of each of the support beams, and each of the second extension sections is located in each of the outer extension frames; a plurality of tenth connecting pieces are provided on each of the inner extension frames.

A lower side of a front half of the support frame is connected to the support beams through two posts, respectively, and a rear end of each of the support beams is connected to a lower side of the support frame through each of inclined support bars; and a plurality of first positioning holes are formed in the support frame.

Preferably, a rear half of the body is a cockpit, and the cockpit is provided with second positioning holes matched with the first positioning holes; a front half of the body is a front frame; an operating area is provided between the front frame and the cockpit; and stepboard frames are provided on both sides of the body, and a stepboard is detachably provided on the stepboard frame.

The beneficial effects of the present invention are as follows: The four-wheeled motorcycle assembled through the frame and the body in the present invention has high precision. Additionally, the frame and the body can be perfectly adapted to each other, thereby improving the stability in use and reducing the difficulty of assembly. Besides, there are also some beneficial effects such as simple structure, low manufacture costs, a high practicability, and a high durability.

DETAILED DESCRIPTION OF THE EMBODIMENTS

Figure 1:
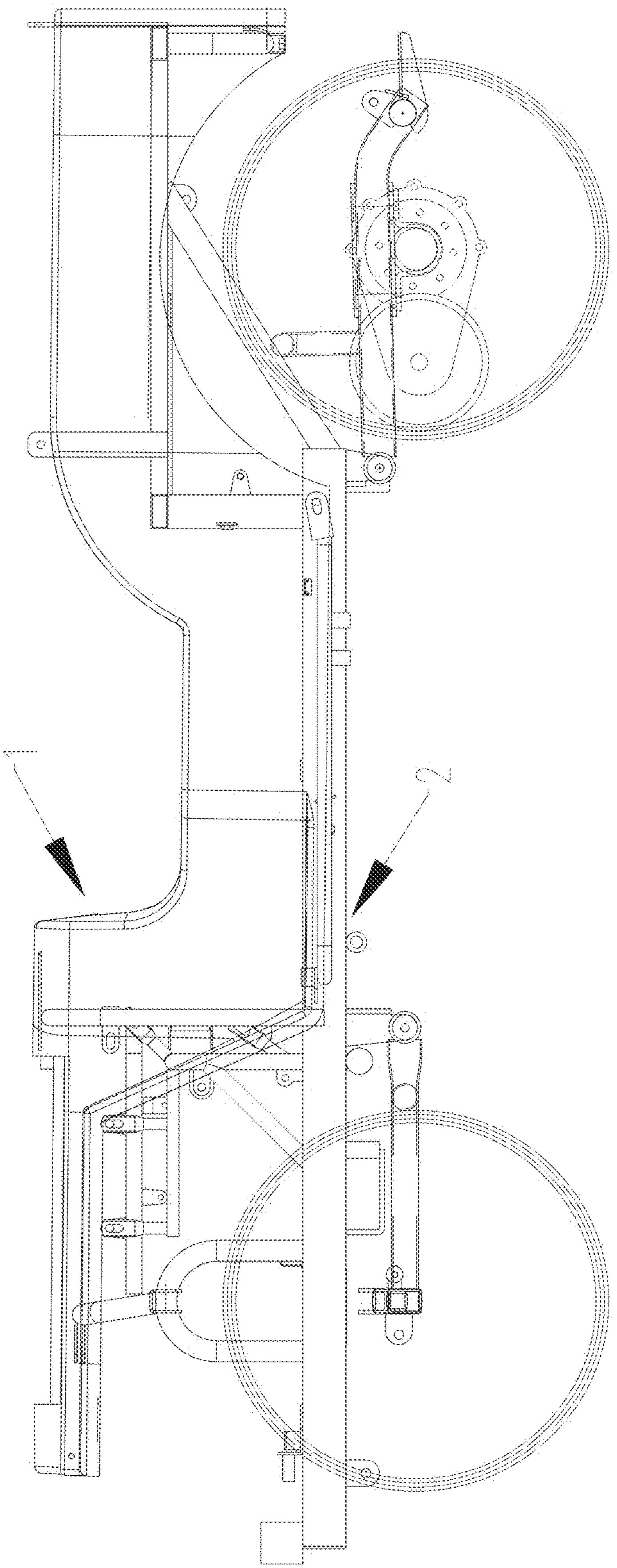
FIG. 1 is a schematic diagram showing the structure of the first embodiment of the present invention.

The present invention is further explained below in combination with the drawings and embodiments:

In the description of the present invention, it should be stated that the orientation or position relationship indicated by the terms “up”, “down”, “left”, “right”, “vertical”, “horizontal”, “inside”, “outside” and others is based on the orientation or position relationship shown in the drawings, which is only for the purpose of convenient description of the present invention and simplification of description, and does not indicate or imply that the device or element referred to must have a specific orientation and be constructed and operated in specific orientation, so they cannot be understood as a limitation to the present invention. In addition, the terms “first”, “second” and “third” are used only for descriptive purposes and cannot be understood to indicate or imply relative importance.

In the description of the present invention, it should be noted that unless otherwise clearly defined and limited, the terms “installation”, “arrangement” and “connection” should be understood in a broad sense, for example, it can be a fixed connection, a detachable connection, or an integrated connection; it can be a mechanical connection or an electrical connection; it can be a direct connection, an indirect connection through an intermediary, or a communication within the interiors of two components. For those skilled in the art, the specific meaning of the above terms in the present invention can be understood based on specific circumstances.

Figure 2:
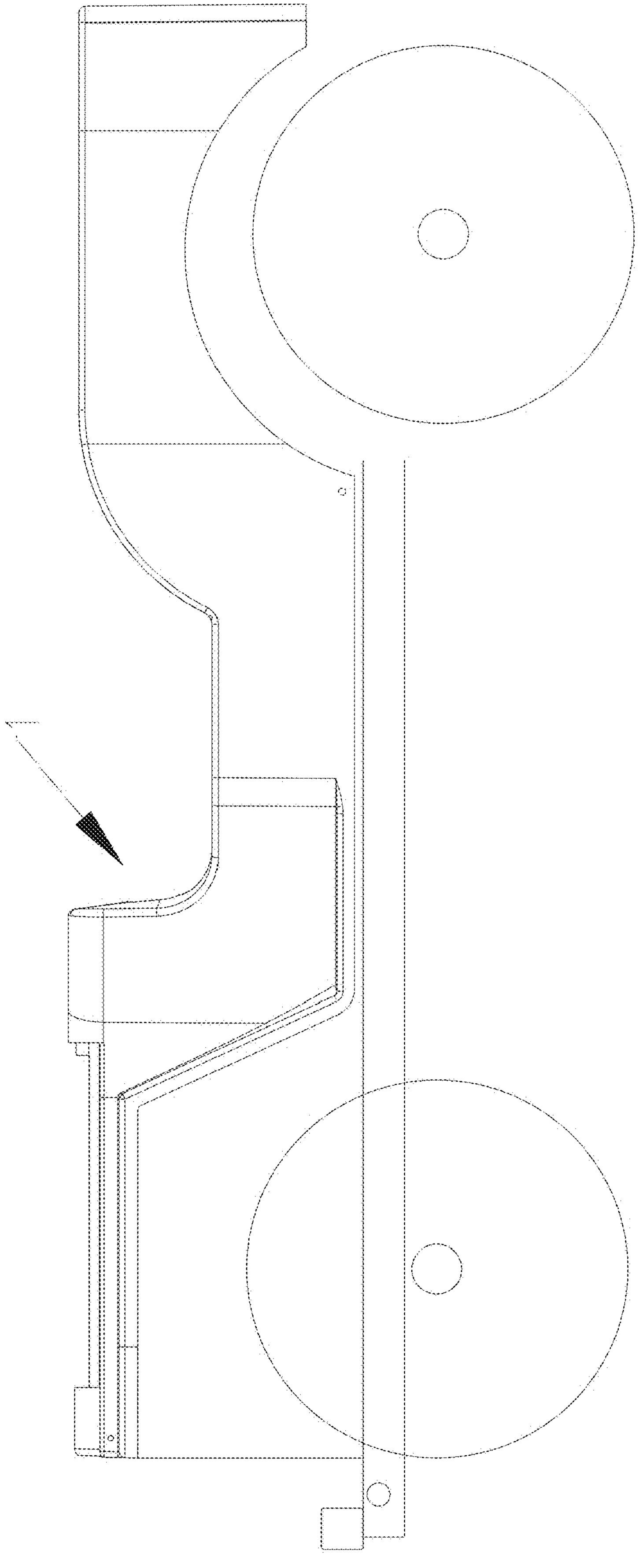
FIG. 2 is a schematic diagram showing the structure of the second embodiment of the present invention.
Figure 3:
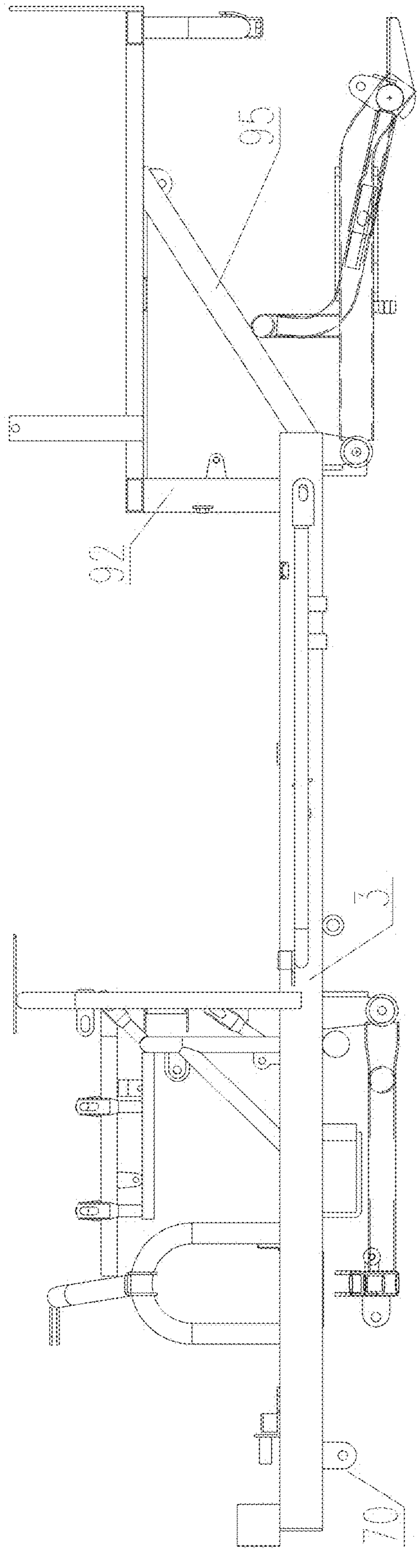
FIG. 3 is a schematic diagram showing the structure of a frame in the present invention.
Figure 4:
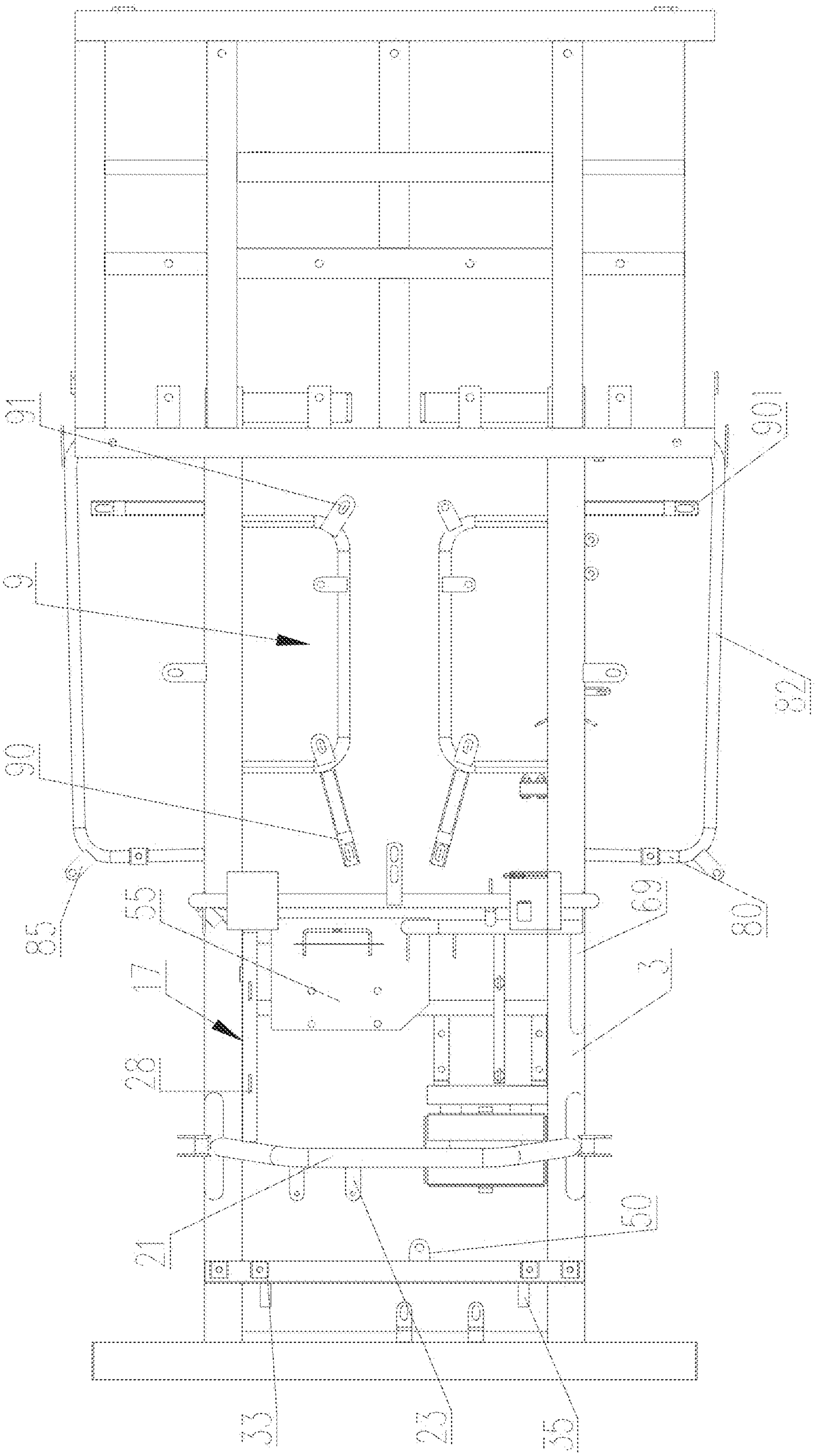
FIG. 4 is a top view of the structure in FIG. 3.
Figure 5:
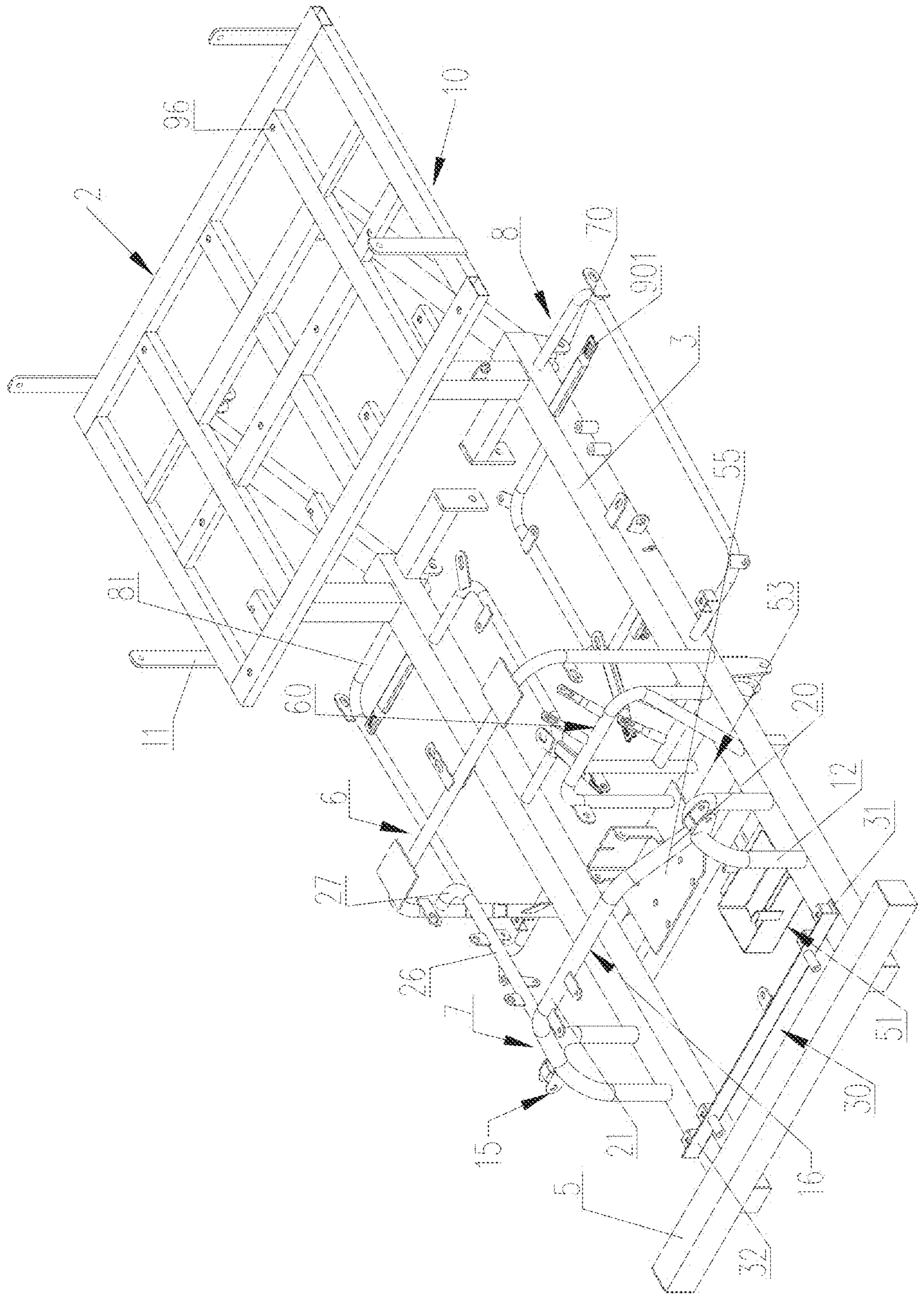
FIG. 5 is a perspective view of the frame in the present invention.
Figure 6:
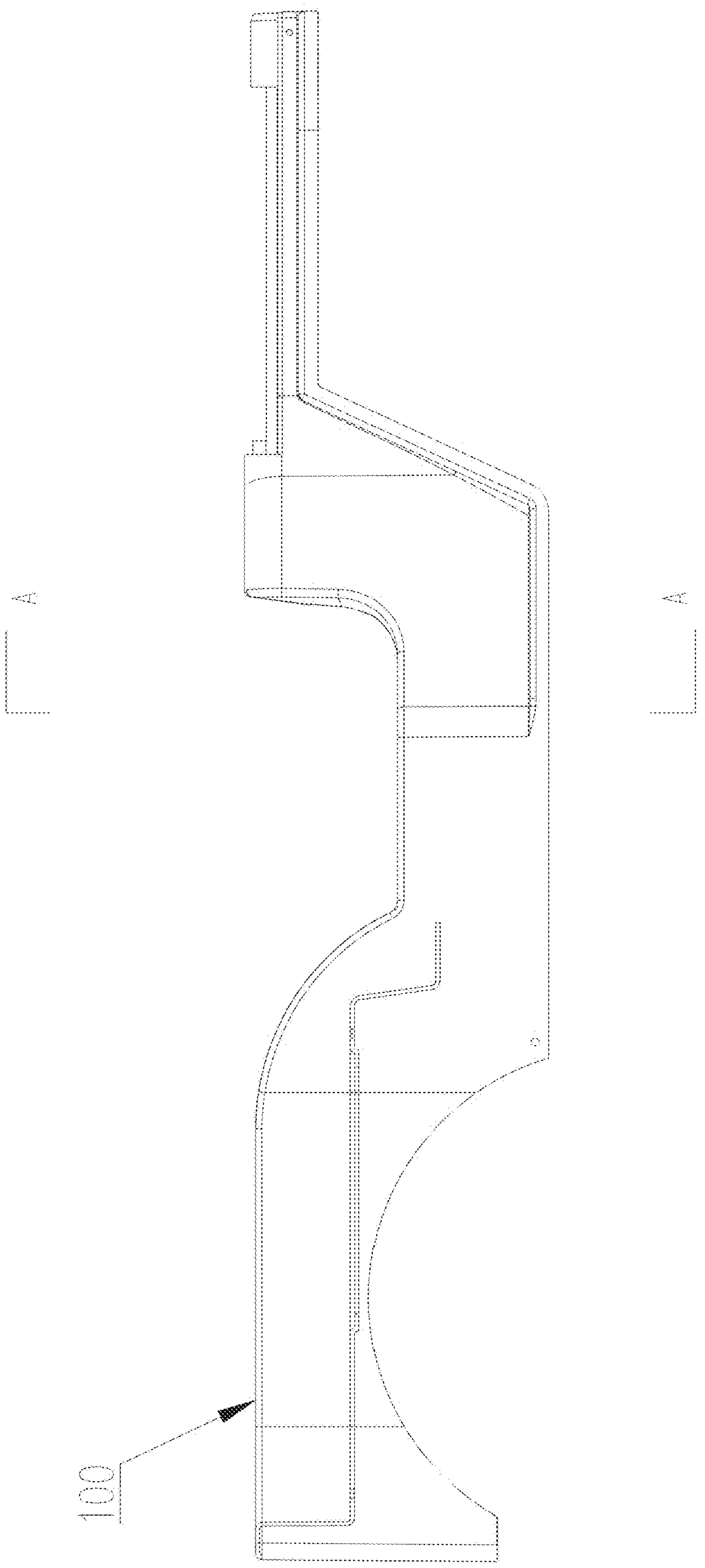
FIG. 6 is a schematic diagram showing the structure of a body in the present invention.
Figure 7:
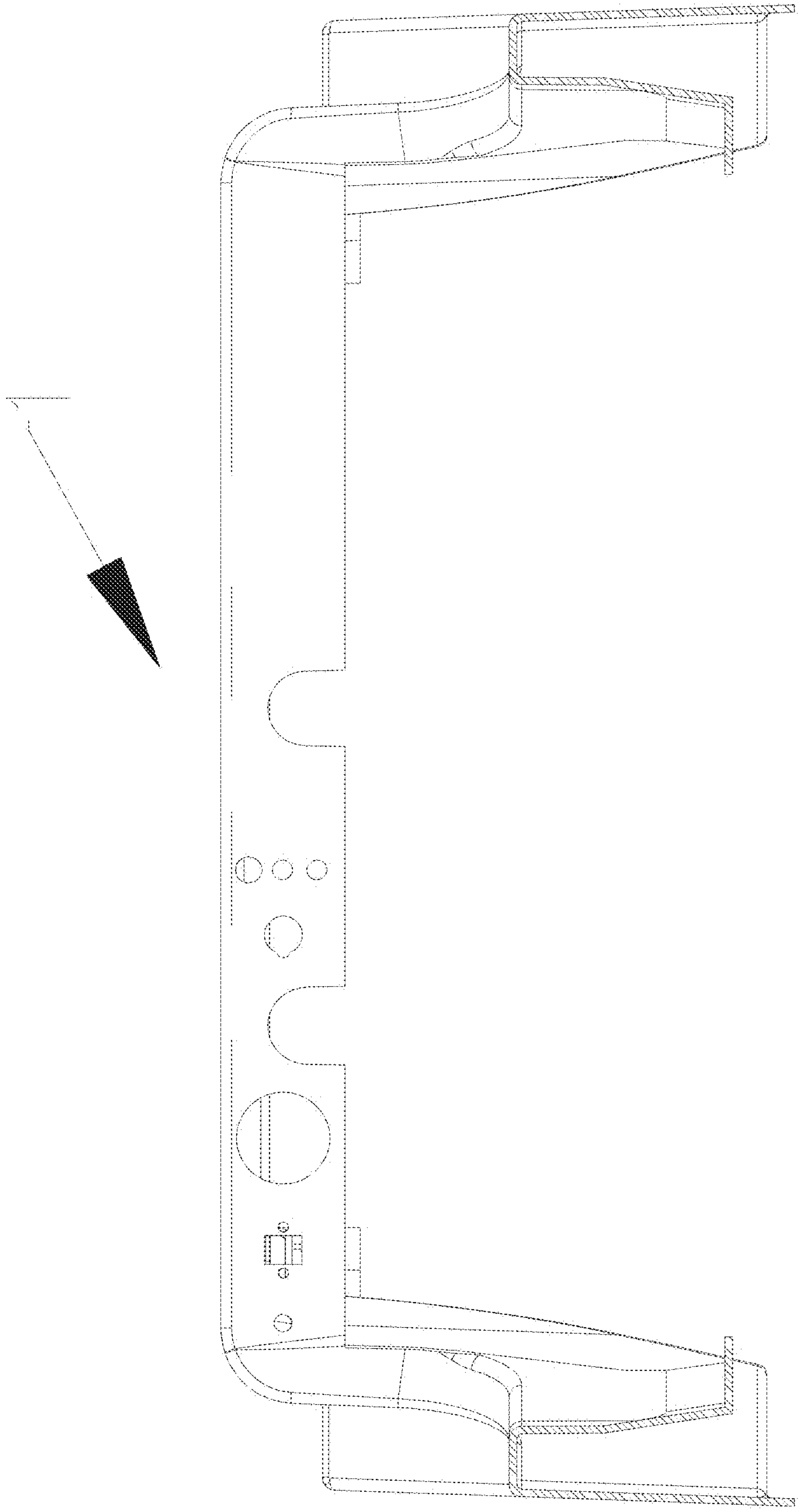
FIG. 7 is a cross section view in the A-A direction of FIG. 6.
Figure 8:
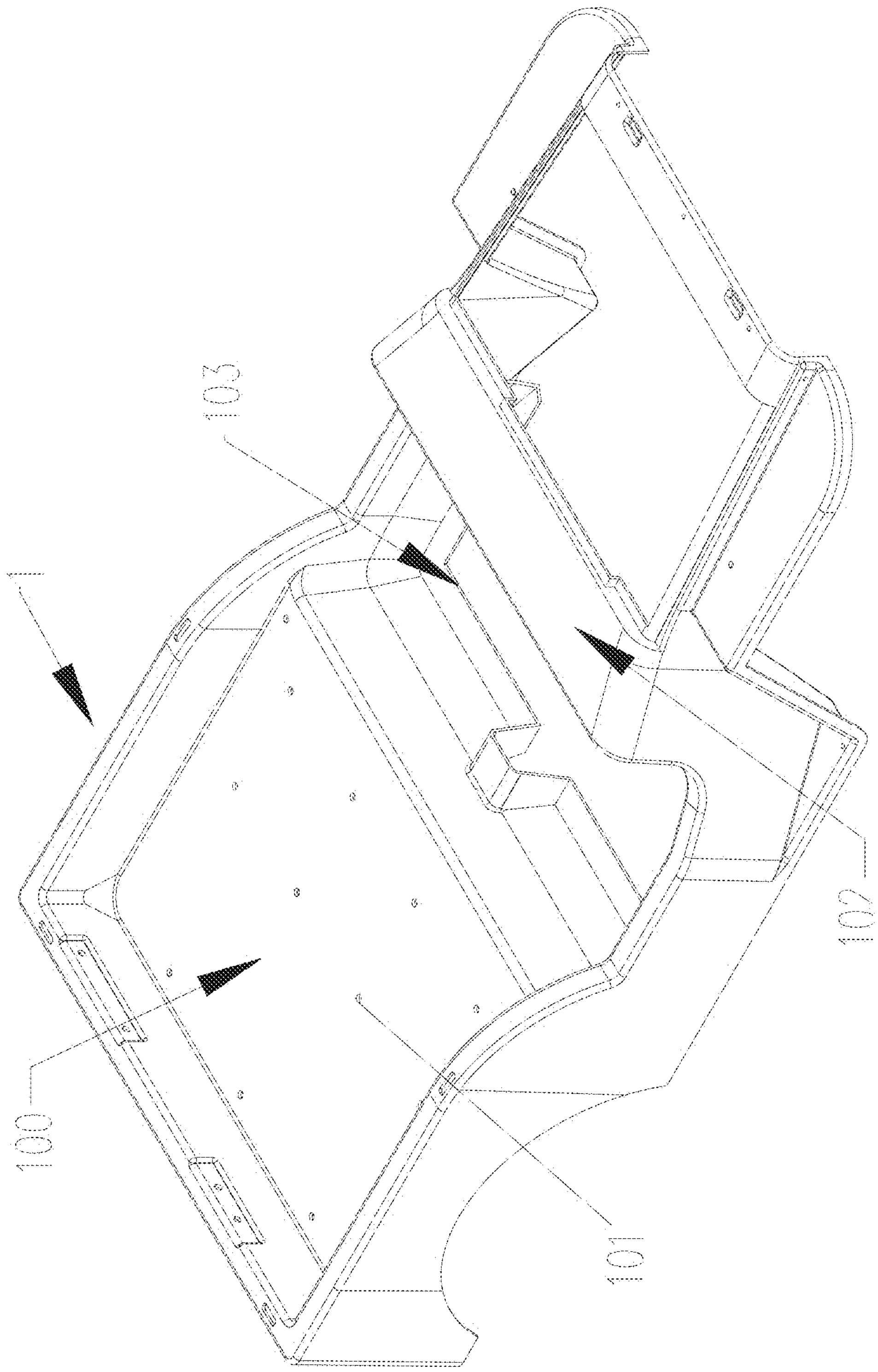
FIG. 8 is a perspective view of the body in the present invention.
Figure 9:
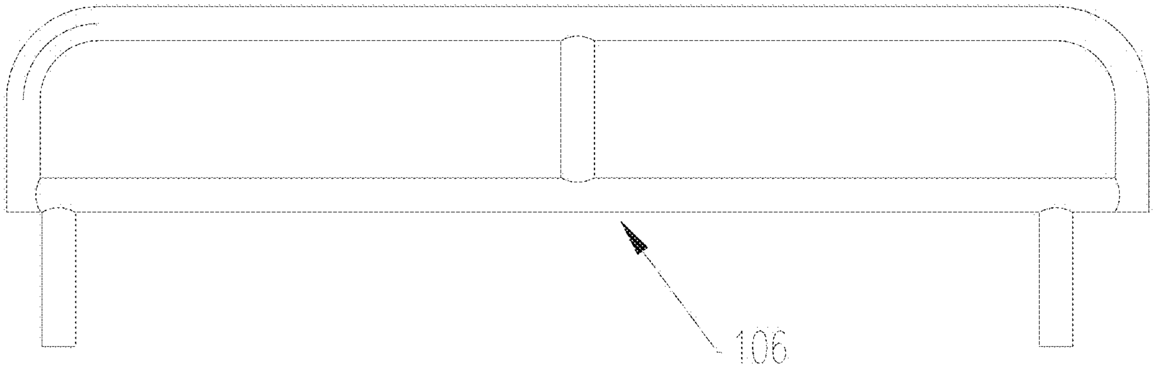
FIG. 9 is a schematic diagram showing the structure of a stepboard frame in the present invention.
Figure 10:
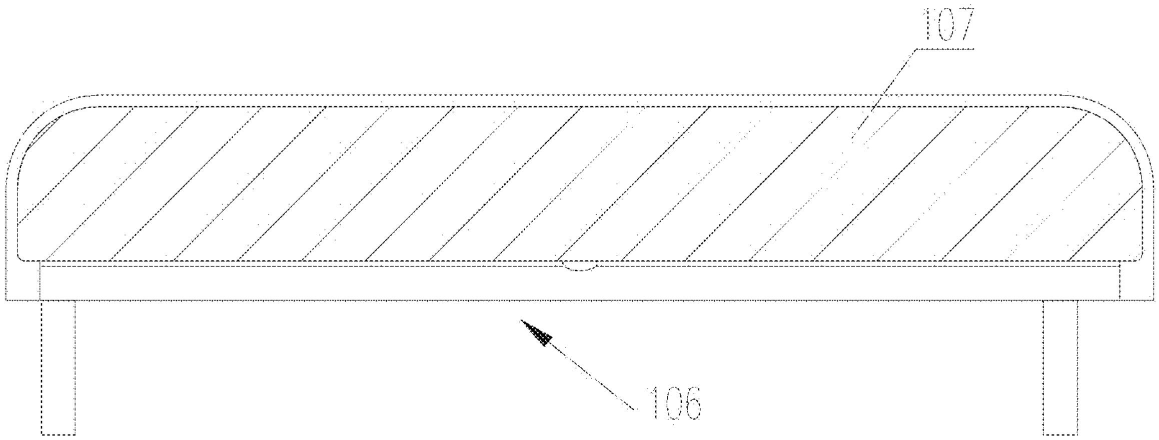
FIG. 10 is a schematic diagram showing that a stepboard is provided on the stepboard frame in the present invention.
Figure 11:
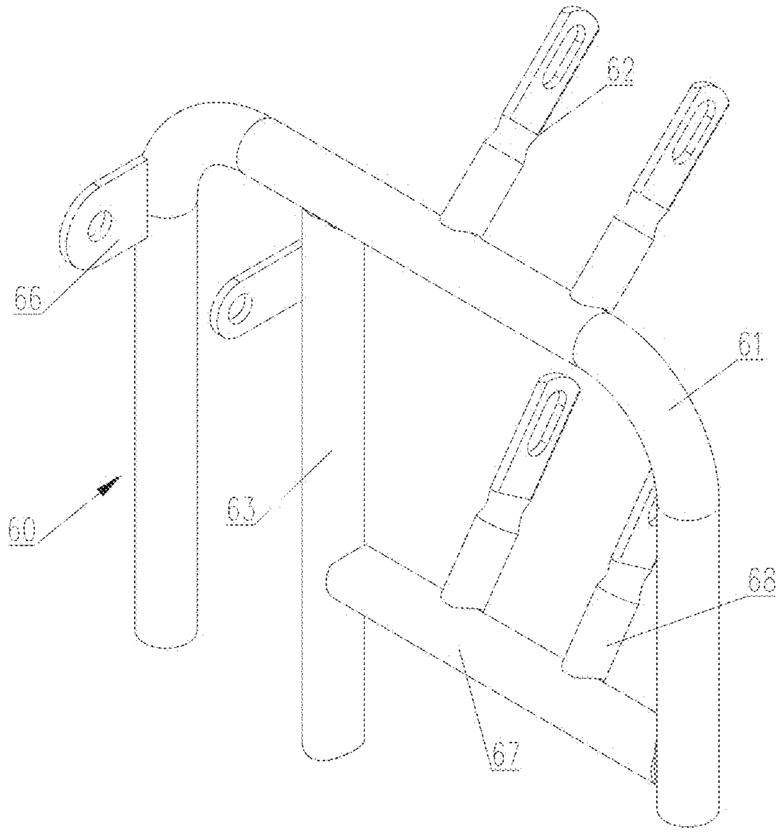
FIG. 11 is a schematic diagram showing the structure of a steering gear bracket in the present invention.
Figure 12:
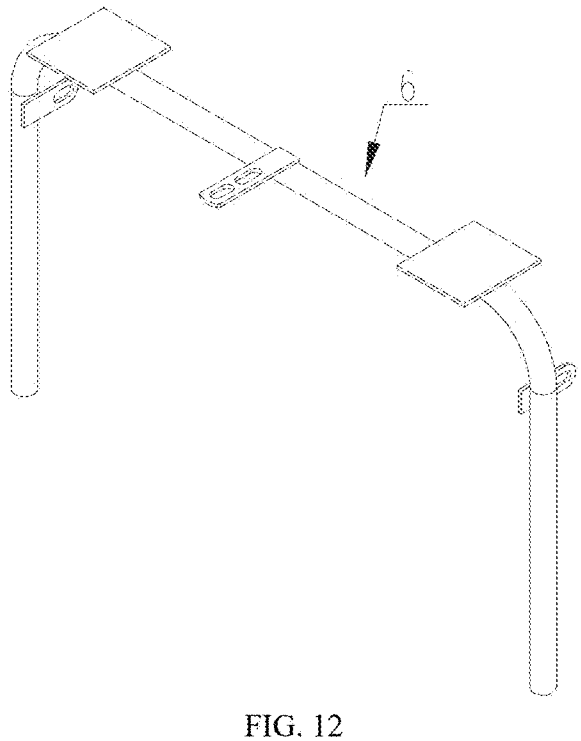
FIG. 12 is a schematic diagram showing the structure of an upper frame cover installation frame in the present invention.

As shown in FIGS. 1 to 12, a novel four-wheeled motorcycle includes body 1 and frame 2, and the body 1 is detachably provided on the frame 2.

The frame 2 includes two support beams 3 provided symmetrically with each other. The front ends of the support beams 3 are connected by reinforcement insurance portion 5, and upper frame cover installation frame 6 is provided on the front halves of the support beams 3. Steering gear bracket 60 is provided below the upper frame cover installation frame 6. Connection support unit 7 is provided between the upper frame cover installation frame 6 and the reinforcement insurance portion 5. Outer extension frames 8 are respectively provided on the outer sides of the rear halves of the support beams 3. Inner extension frames 9 are provided between the outer extension frames 8, and each of the inner extension frames 9 is connected to the inner side of each of the support beams 3. Upper sides of the rear halves of the support beams 3 are synchronously connected to support frame 10, and the outer edge of the support frame 10 is provided with a plurality of positioning plates 11.

The reinforcement insurance portion 5 and the support beams 3 are in an integrated structure. The connection support unit 7 includes two U-shaped support tubes 12 provided symmetrically with each other. The lower end of each of the U-shaped support tubes 12 is connected to the upper side of the front half of each of the support beams 3, the outer side of the upper end of each of the U-shaped support tubes 12 is provided with first connecting piece 15, and the inner sides of the U-shaped support tubes 12 are connected by connecting section 16. The U-shaped support tube 12 is connected to the upper frame cover installation frame 6 through extension tube 17.

The connecting section 16 includes two inclined sections 20 provided symmetrically with each other, each of the inclined sections 20 is arranged obliquely with a low outer end and a high inner end, the outer end of each of the inclined sections 20 is connected to each of the U-shaped support tubes 12, the inner ends of the inclined sections 20 are respectively connected to two ends of straight section 21, and the two inclined sections 20 and one straight section 21 are in an integrated structure. A plurality of second connecting pieces 23 are provided on the straight section 21.

The extension tube 17 includes extension portion 26. The front end of the extension portion 26 is connected to the U-shaped support tube 12, and the rear end of the extension portion 26 is provided with bending portion 27. One end of the bending portion 27 is connected to the extension portion 26, and the other end of the bending portion 27 is bent outward and connected to the upper frame cover installation frame 6. A plurality of third connecting pieces 28 are provided along the length direction of the extension portion 26, and every two adjacent third connecting pieces 28 are misaligned.

Crossbar 30 is provided between the reinforcement insurance portion 5 and the connecting section 16, and the crossbar 30 includes connecting portion 31. The front end of the connecting portion 31 is provided with extension section 32, the connecting portion 31 and the extension section 32 are in an integrated structure and with an L-shaped cross section, two ends of the connecting portion 31 are respectively connected to the upper sides of the two front halves of the support beams 3, and a plurality of positioning seats 33 are provided on the connecting portion 31. The front side of the extension section 32 is provided with a plurality of cylinders 35. The rear side of the connecting portion 31 is provided with fourth connecting piece 50.

The inner side of the front half of the support beam 3 is provided with positioning frame 51, and the middle sections of the support beams 3 are connected by supporting piece 53. The supporting piece 53 is provided with power installation plate 55 and the steering gear bracket 60. The steering gear bracket 60 includes arc-shaped main body section 61. The middle section of the main body section 61 is provided with fifth connecting piece 62, two ends of the main body section 61 are respectively connected to an upper side of the support beam 3 and the upper side of the power installation plate 55, and the arc-shaped main body section 61 is provided with vertical tube 63. The vertical tube 63 and the main body section 61 are respectively provided with sixth connecting pieces 66 matched with each other, and the lower half of the vertical tube 63 and the lower half of the main body section 61 are connected by horizontal tube 67. The upper side of the horizontal tube 67 is provided with two seventh connecting pieces 68 matched with the fifth connecting piece 62.

Reinforcement tube 69 is provided at the corner between the main body section 61 and the support beam 3, and a plurality of eighth connecting pieces 70 are provided at the rear end of the lower side of each of the support beams 3.

The outer extension frame 8 includes first positioning section 80, outer expansion section 82 and second positioning section 81 that are integrated with each other. The inner side of the first positioning section 80 and the inner side of the second positioning section 81 are connected to the outer wall of the support beam 3. The length of the second positioning section 81 is greater than the length of the first positioning section 80. The outer expansion section 82 on each of the two outer extension frames 8 has a space that gradually increases from front to back. Each of the first positioning sections 80 and each of the second positioning sections 81 are connected by each of the outer expansion sections 82. Ninth connecting piece 85 is provided on each of the outer extension frames 8.

The front half of the inner extension frame 9 is provided with first extension section 90, and each of the first extension sections 90 is inclined inward. Second extension section 901 is provided on the outer wall of the rear section of each of the support beams 3, and each of the second extension sections 901 is located in each of the outer extension frames 8. A plurality of tenth connecting pieces 91 are provided on each of the inner extension frames 9. The lower side of the front half of the support frame 10 is connected to the support beams 3 through two posts 92, respectively, and the rear end of each of the support beams 3 is connected to the lower side of the support frame 10 through each of inclined support bars 95. A plurality of first positioning holes 96 are formed in the support frame 10.

The rear half of the body 1 is cockpit 100, and the cockpit 100 is provided with second positioning holes 101 matched with the first positioning holes 96. The front half of the body 1 is front frame 102. Operating area 103 is provided between the front frame 102 and the cockpit 100. Stepboard frames 106 are provided on both sides of the body 1, and stepboard 107 is detachably provided on the stepboard frame 106.

The present invention mainly relates to a small four-wheeled motorcycle, which is similar to a jeep in shape. The four-wheeled motorcycle assembled through the frame and the body in the present invention has high precision. Additionally, the frame and the body can be perfectly adapted to each other, thereby improving the stability in use and reducing the difficulty of assembly.

The preferable embodiments of the present invention are described in detail above. It should be understood that those skilled in the art can make many modifications and changes according to the ideas of the present invention without creative work. Therefore, all technical solutions that can be obtained by those skilled in the art through logical analysis, reasoning or limited experiments on the basis of the prior art according to the ideas of the present invention shall fall within the scope of protection defined by the claims.

What is claimed is:

1. A four-wheeled motorcycle, comprising a body and a frame, wherein the body is detachably provided on the frame;

the frame comprises two support beams provided symmetrically with each other;

front ends of the support beams are connected by a reinforcement insurance portion, and an upper frame cover installation frame is provided on front halves of the support beams;

a steering gear bracket is provided below the upper frame cover installation frame;

a connection support unit is provided between the upper frame cover installation frame and the reinforcement insurance portion;

outer extension frames are respectively provided on outer sides of rear halves of the support beams;

inner extension frames are provided between the outer extension frames, and each of the inner extension frames is connected to an inner side of each of the support beams; and upper sides of the rear halves of the support beams are synchronously connected to a support frame, and an outer edge of the support frame is provided with a plurality of positioning plates, wherein the reinforcement insurance portion and the support beams are in an integrated structure;

the connection support unit comprises two U-shaped support tubes provided symmetrically with each other;

a lower end of each of the U-shaped support tubes is connected to an upper side of the front half of each of the support beams, an outer side of an upper end of each of the U-shaped support tubes is provided with a first connecting piece, and inner sides of the U-shaped support tubes are connected by a connecting section; and the U-shaped support tube is connected to the upper frame cover installation frame through an extension tube.

2. The four-wheeled motorcycle according to claim 1, wherein the connecting section comprises two inclined sections provided symmetrically with each other, each of the inclined sections is arranged obliquely with a low outer end and a high inner end, the outer end of each of the inclined sections is connected to each of the U-shaped support tubes, the inner ends of the inclined sections are respectively connected to two ends of a straight section, and the two inclined sections and one straight section are in an integrated structure; and a plurality of second connecting pieces are provided on the straight section.

3. The four-wheeled motorcycle according to claim 2, wherein the extension tube comprises an extension portion, wherein a front end of the extension portion is connected to the U-shaped support tube, and a rear end of the extension portion is provided with a bending portion;

a first end of the bending portion is connected to the extension portion, and a second end of the bending portion is bent outward and connected to the upper frame cover installation frame; and a plurality of third connecting pieces are provided along a length direction of the extension portion, and every two adjacent third connecting pieces are misaligned.

4. The four-wheeled motorcycle according to claim 3, wherein a crossbar is provided between the reinforcement insurance portion and the connecting section, and the crossbar comprises a connecting portion;

a front end of the connecting portion is provided with an extension section, the connecting portion and the extension section are in an integrated structure and with an L-shaped cross section, two ends of the connecting portion are respectively connected to the upper sides of the two front halves of the support beams, and a plurality of positioning seats are provided on the connecting portion;

a front side of the extension section is provided with a plurality of cylinders; and a rear side of the connecting portion is provided with a fourth connecting piece.

5. The four-wheeled motorcycle according to claim 4, wherein the inner side of the front half of the support beam is provided with a positioning frame, and middle sections of the support beams are connected by a supporting piece;

the supporting piece is provided with a power installation plate and the steering gear bracket;

the steering gear bracket comprises an arc-shaped main body section;

a middle section of the main body section is provided with a fifth connecting piece, two ends of the main body section are respectively connected to an upper side of the support beam and an upper side of the power installation plate, and the arc-shaped main body section is provided with a vertical tube;

the vertical tube and the main body section are respectively provided with sixth connecting pieces matched with each other, and a lower half of the vertical tube and a lower half of the main body section are connected by a horizontal tube; and an upper side of the horizontal tube is provided with two seventh connecting pieces matched with the fifth connecting piece.

6. The four-wheeled motorcycle according to claim 5, wherein a reinforcement tube is provided at a corner between the main body section and the support beam, and a plurality of eighth connecting pieces are provided at a rear end of a lower side of each of the support beams.

7. The four-wheeled motorcycle according to claim 6, wherein the outer extension frame comprises a first positioning section, an outer expansion section and a second positioning section, the first positioning section, the outer expansion section and the second positioning section are integrated with each other;

an inner side of the first positioning section and an inner side of the second positioning section are connected to an outer wall of the support beam;

a length of the second positioning section is greater than a length of the first positioning section;

the outer expansion section on each of the two outer extension frames has a space, the space gradually increases from front to back;

each of the first positioning sections and each of the second positioning sections are connected by each of the outer expansion sections; and a ninth connecting piece is provided on each of the outer extension frames.

8. The four-wheeled motorcycle according to claim 7, wherein a front half of the inner extension frame is provided with a first extension section, and each of the first extension sections is inclined inward; a second extension section is provided on the outer wall of a rear section of each of the support beams, and each of the second extension sections is located in each of the outer extension frames; a plurality of tenth connecting pieces are provided on each of the inner extension frames;

a lower side of a front half of the support frame is connected to the support beams through two posts, respectively, and a rear end of each of the support beams is connected to a lower side of the support frame through each of inclined support bars; and a plurality of first positioning holes are formed in the support frame.

9. The four-wheeled motorcycle according to claim 8, wherein a rear half of the body is a cockpit, and the cockpit is provided with second positioning holes matched with the first positioning holes;

a front half of the body is a front frame;

an operating area is provided between the front frame and the cockpit; and stepboard frames are provided on both sides of the body, and a stepboard is detachably provided on the stepboard frame.

* * * * *